(12) United States Patent
Xu et al.

(10) Patent No.: US 7,483,238 B2
(45) Date of Patent: Jan. 27, 2009

(54) SHOCK ABSORBING DEVICE FOR AN ENCLOSURE

(75) Inventors: Mo Xu, Singapore (SG); Xiong Liu, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 402 days.

(21) Appl. No.: 11/298,220

(22) Filed: Dec. 9, 2005

(65) Prior Publication Data

US 2007/0133121 A1 Jun. 14, 2007

(51) Int. Cl.
*G11B 17/00* (2006.01)
(52) U.S. Cl. .................................... 360/97.01; 360/137
(58) Field of Classification Search .............. 360/97.01, 360/97.02, 137; 361/679, 685; 720/651; 312/223.2; 369/263
See application file for complete search history.

(56) References Cited

U.S. PATENT DOCUMENTS

| | | | | |
|---|---|---|---|---|
| 5,623,390 A * | 4/1997 | Noda et al. | ................. | 361/679 |
| 5,677,813 A * | 10/1997 | Yoshida et al. | ........... | 360/97.02 |
| 5,721,457 A * | 2/1998 | Sri-Jayantha et al. | ....... | 307/119 |
| 6,034,841 A | 3/2000 | Albrecht et al. | .......... | 360/97.01 |
| 6,137,759 A | 10/2000 | Ogiro et al. | ................ | 369/75.2 |
| 6,259,599 B1 * | 7/2001 | Gamble et al. | .............. | 361/685 |
| 6,278,574 B1 | 8/2001 | Wakita et al. | ............ | 360/99.01 |
| 6,299,266 B1 * | 10/2001 | Justice et al. | ............ | 312/223.2 |
| 6,426,847 B1 | 7/2002 | Dague et al. | .............. | 360/97.01 |
| 6,545,865 B2 | 4/2003 | Albrecht et al. | ............. | 361/685 |
| 6,704,161 B1 | 3/2004 | Pham et al. | ............... | 360/97.02 |
| 6,735,043 B2 | 5/2004 | Bernett et al. | ............ | 360/97.01 |
| 6,826,018 B2 | 11/2004 | Kuwajima et al. | ........ | 360/254.3 |
| 6,873,524 B2 | 3/2005 | Kaczeus, Sr. et al. | ....... | 361/685 |
| 2003/0011980 A1 | 1/2003 | Albrecht et al. | ............. | 361/685 |
| 2003/0026037 A1 | 2/2003 | O'Sullivan et al. | ........ | 360/97.01 |
| 2003/0161253 A1 * | 8/2003 | Liao et al. | .................... | 369/263 |
| 2004/0076103 A1 | 4/2004 | Drouin | ...................... | 369/75.1 |
| 2004/0081054 A1 | 4/2004 | Nguyen | ..................... | 369/75.1 |
| 2004/0190193 A1 * | 9/2004 | Kuwajima | ................ | 360/97.01 |
| 2004/0213095 A1 | 10/2004 | Volk et al. | ................ | 369/30.63 |
| 2004/0255313 A1 * | 12/2004 | Kaczeus et al. | ............. | 720/651 |
| 2005/0046996 A1 | 3/2005 | Kimura et al. | ........... | 360/97.01 |
| 2006/0130083 A1 * | 6/2006 | Cheng | ........................ | 720/651 |

FOREIGN PATENT DOCUMENTS

WO WO 00/74049 7/2000

* cited by examiner

*Primary Examiner*—Tianjie Chen
(74) *Attorney, Agent, or Firm*—Leanne Taveggia Farrell; Westman, Champlin & Kelly, P.A.

(57) ABSTRACT

A shock absorbing device for an enclosure. The shock absorbing device including a shock absorbing frame. The shock absorbing frame includes an inner surface coupled adjacent to the enclosure and an outer surface. The shock absorbing device also includes a plurality flexible shock bumpers spaced apart from each other and formed on the outer surface of the shock absorbing frame. Each flexible shock feature includes a mount feature.

16 Claims, 7 Drawing Sheets

SHOCK ABSORBING DEVICE FOR AN ENCLOSURE

FIELD OF THE INVENTION

The present invention relates generally to shock absorbing devices, and more particularly but not by limitation to shock absorbing devices for data storage systems.

BACKGROUND OF THE INVENTION

Disc drives are typical data storage systems and are commonly used in work stations, personal computers, portable computers and other computing systems to store large amounts of data in a form that can be readily available to a user. A disc drive includes a head disc assembly that is attached to a printed circuit board assembly. The head disc assembly includes a variety of components. The components include one or more discs having data surfaces that are coated with a magnetizable medium for storage of digital information in a plurality of circular, concentric data tracks. The disc(s) are mounted on a spindle motor that causes the disc(s) to spin and the data surfaces of the disc(s) to pass under respective aerodynamic bearing disc head sliders. The sliders carry magnetic transducers, which write information to and read information from the data surfaces of the discs.

With the rapid increase in a real density of the magnetizable medium, continued demand exists for disc drives having a small size suitable for use in handheld or portable devices, such as communication devices (e.g. cell phones), audio devices (e.g. digital music players), computing machines (e.g. personal data assistants), video recorders (e.g. digital cameras) and other small consumer applications. Small sized disc drives for use with these types of consumer products must be robust enough to withstand accidental drops and high operating shock and vibration levels.

In general, shock bumper designs for disc drives use hard and inflexible materials to absorb external shock. The thicker the hard and inflexible material, the more shock energy can be absorbed. For small sized disc drives, the spaced allotted for a shock bumper is limited. Therefore, the thickness of the material is also limited and allows for only a limited amount of shock energy to be absorbed.

Embodiments of the present invention provide solutions to these and other problems, and offer other advantages over the prior art.

SUMMARY OF THE INVENTION

The present invention generally relates to a shock absorbing device in a data storage system. The data storage system includes an enclosure commonly referred to as a head disc assembly and a printed circuit board assembly coupled to the head disc assembly. The shock absorbing device protects the head disc assembly and the printed circuit board assembly from non-operational shock and operational shock. The shock absorbing device includes a shock absorbing frame that includes a inner surface coupled adjacent the enclosure and an outer surface. The shock absorbing device also includes a plurality of flexible shock bumpers spaced apart from each other and formed on the outer surface of the shock absorbing frame. Each flexible shock feature includes a mount feature.

Other features and benefits that characterize embodiments of the present invention will be apparent upon reading the following detailed description and review of the associated drawings.

DETAILED DESCRIPTION OF ILLUSTRATIVE EMBODIMENTS

The present invention includes a shock absorbing device for a data storage system. The data storage system includes a head disc assembly (HDA) and a printed circuit board assembly (PCBA). The HDA includes an enclosure for surrounding a plurality of internal components. The HDA can be of a small size and is coupled to the PCBA, which has a corresponding small size. The HDA and the PCBA are at least partially surrounded by a shock absorbing device. In one embodiment, the shock absorbing device is configured for use with a PCBA that includes an electrical connector located on the top of the PCBA. In another embodiment, the shock absorbing device is configured for use with a PCBA that includes an electrical connector located on the side of the PCBA. In this embodiment, one of the sides of the shock absorbing device is configured to accommodate an electrical connector body. The following description describes embodiments of the invention in detail.

Figure 1:
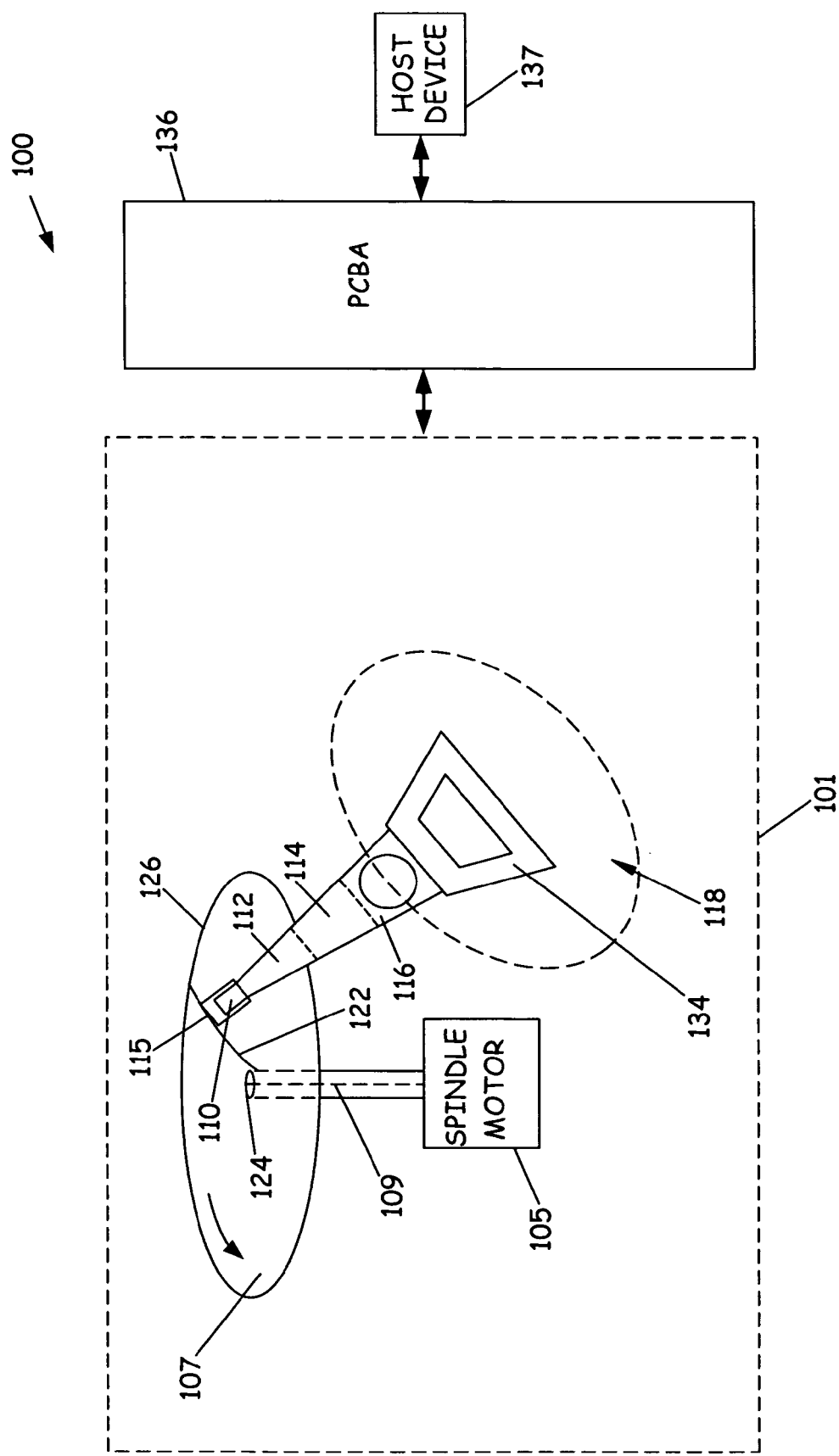
FIG. 1 illustrates a simplified schematic diagram of a data storage system.

FIG. 1 is a simplified schematic diagram of a disc drive 100 in which embodiments of the present invention are useful. Disc drives are common data storage systems. Disc drive 100 includes a hermetically sealed enclosure 101 also referred to as a head disc assembly (HDA). In general, although not illustrated in FIG. 1, enclosure or HDA 101 is defined by a base, a top cover and sidewalls. Enclosure or HDA 101 includes a disc 107. Those skilled in the art should recognize that disc drive 100 can include a single disc, as illustrated in FIG. 1, or multiple discs included in a disc pack. Disc 107 is mounted on a spindle motor 105 for rotation about central axis 109. Each disc surface has an associated slider 110. Each slider 110 carries a read/write head for communication with the surface on the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126. While FIG. 1 illustrates one manner of actuating a data head proximate a data storage medium, the present invention, however, is applicable to data storage systems that use other techniques.

Disc drive 100 also includes a printed circuit board assembly (PCBA) 136. PCBA 136 is located outside enclosure or HDA 101. In general, PCBA 136 is mounted to an outer surface of enclosure or HDA 101. PCBA 136 supports a plurality of printed circuit components (not shown in FIG. 1). The printed circuit components are configured to couple to components enclosed within enclosure or HDA 101, such as spindle motor 105, slider 110, actuator mechanism 116 and voice coil motor 118, and configured to communicate with a host device 137.

Figure 2:
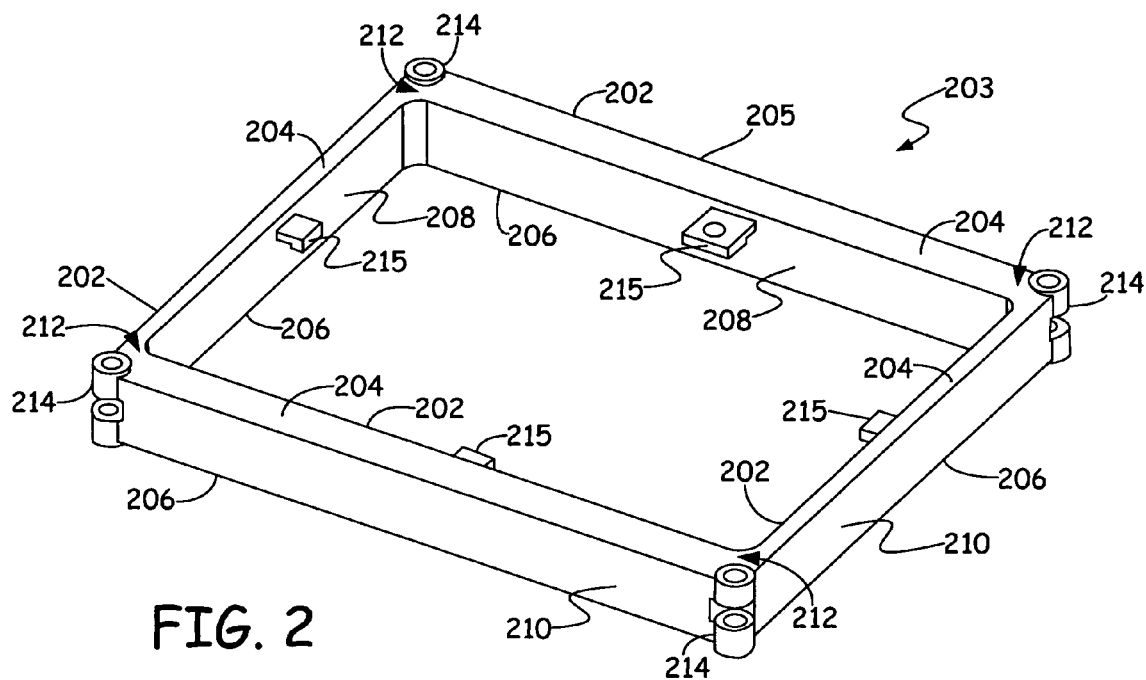
FIG. 2 illustrates a bottom perspective view of an embodiment of a shock absorbing device.

FIG. 2 illustrates a bottom perspective view of a shock absorbing device 203 in accordance with an embodiment of the present invention. Shock absorbing device 203, although not illustrated in FIG. 2, is configured to at least partially surround a small head disc assembly. Shock absorbing device includes a shock absorbing frame 205. Shock absorbing frame 205 includes bottom surface 204, top surface 206, inner surface 208 and outer surface 210. Shock absorbing frame 205 also includes a plurality of mutually coupled rails 202. The plurality of rails are mutually coupled to form four corners 212.

Shock absorbing device 203 includes a plurality of flexible shock bumpers 214 integrally formed with shock absorbing frame 205 and positioned at each of the four corners 212 of rails 202. Flexible shock bumpers 214 extend below bottom surface 204 of shock absorbing frame 205, extend above top surface 206 of shock absorbing frame 205 and extend outwardly from outer surface 210 of shock absorbing frame 205. Flexible shock bumpers 214 assist in absorbing shock energy inflicted on the head disc assembly (not shown in FIG. 2) when the head disc assembly is placed under stress. For example, flexible shock bumpers 214 can absorb shock energy suffered by the head disc assembly when the head disc assembly is not in operation. Generally, non-operational shock events occurs when the head disc assembly is dropped or placed under vibration. As a result, components in the head disc assembly can collide and damage each other. Flexible shock bumpers 214 can also absorb shock energy suffered by the head disc assembly when the head disc assembly is in operation. Generally, operational shock events occur when the host device generates vibrational energy that is transmitted to the head disc assembly. As a result, the head disc assembly is adversely affected by mechanical resonance and downgraded performance of the head disc assembly. Shock absorbing device 203 also includes a plurality of lock features 215. Each lock feature 215 is positioned on inner surface 208 of shock absorbing frame 205. The lock features 215 engage a hermetically sealed enclosure or head disc assembly (HDA) of a disc drive to shock absorbing frame 205. Lock features 215 can also be used to press a printed circuit board assembly (PCBA) against a HDA such that a PCBA can be tightly mounted to a HDA. Although FIG. 2 illustrates inner surface 208 of shock absorbing frame 205 having a lock feature, shock absorbing device 203 can include any number of lock features.

Figure 3:
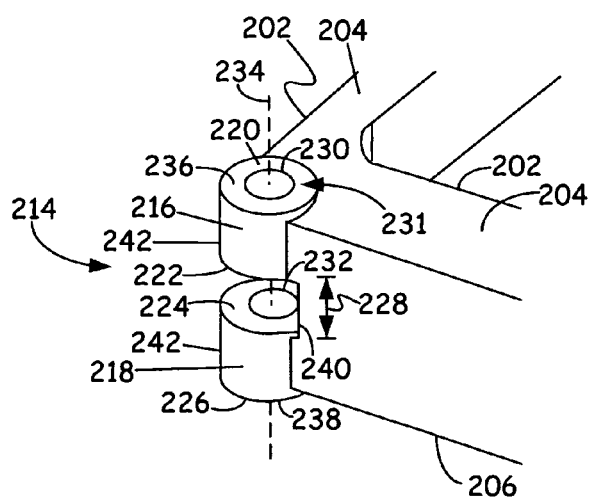
FIG. 3 illustrates an enlarged bottom perspective view of an embodiment of a flexible shock bumper.

FIG. 3 illustrates an enlarged bottom perspective view of flexible shock bumper 214 in accordance with an embodiment of the present invention. The embodiment of flexible shock bumper 214 illustrated in FIG. 3 coincides with the embodiment illustrated in FIG. 2. In this embodiment, flexible shock bumper 214 includes a first member 216 and a second member 218. First member 216 includes a first surface 220 and a second surface 222. Second member 218 includes a first surface 224 and a second surface 226. The first surface 220 of first member 216 extends below bottom surface 204 of shock absorbing frame 205 and the second surface 226 of second member 218 extends above top surface 206 of shock absorbing frame 205. The second surface 222 of first member 216 is spaced apart from the first surface 224 of second member 218 by a distance 228. Flexible shock bumper 214 includes a mount feature 231. Mount feature 231 includes a first aperture 230 in first member 216 and includes a second aperture 232 in second member 218. First aperture 230 and second aperture 232 are centered about an axis 234. Therefore, first aperture 230 and second aperture 232 are coaxial. At least one of first aperture 230 and second aperture 232 are configured to receive a mount fastener for mounting the shock absorbing device 203 to a host device. Although flexible shock bumper 214 is illustrated in FIGS. 2 and 3 as having a circular shape, it should be recognized that flexible shock bumper 214 and can have other shapes, such as rectangular or triangular shapes.

Mount feature 231, as illustrated in FIGS. 2 and 3, can also be thought of as including a single aperture that extends between a first surface 236 and a second surface 238. First surface 236 extends below bottom surface 204 of shock absorbing frame 205 and second surface 238 extends above top surface 206 of shock absorbing frame 205. Such a flexible shock bumper 214 includes a recessed slot 240 that extends from an outer surface 242 of flexible shock feature 214, transversely through the single aperture and towards the outer surfaces 210 of the rails 202. Like the description in the above paragraph, the single aperture is configured to receive a mount fastener, such as a screw, for mounting the shock absorbing device 203 to a host device and the shape of the flexible shock bumper can be other shapes besides a circular shape as shown. In addition, the shape of recessed slot 240 can have a different geometry than that which is illustrated in FIGS. 2 and 3. Recessed slot 240 provides additional shock absorption when mounting the head disc assembly to a host device compared to the embodiment illustrated in FIG. 4.

Figure 4:
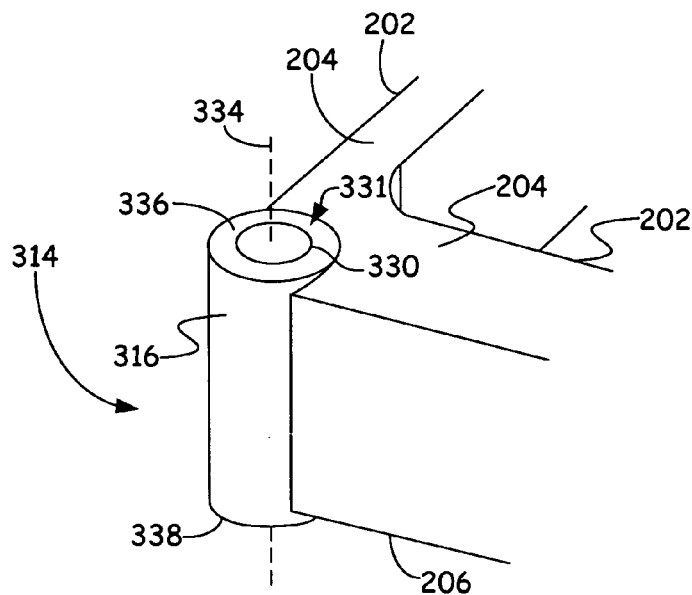
FIG. 4 illustrates an enlarged bottom perspective view of an embodiment of a flexible shock bumper.

FIG. 4 illustrates an enlarged bottom perspective view of a flexible shock bumper 314 in accordance with an alternative embodiment of the present invention. In this embodiment, flexible shock bumper 314 includes a first member 316. First member 316 includes a first surface 336 and a second surface 338. First surface 336 of first member 316 extends below bottom surface 204 of shock absorbing frame 205 and second surface 338 of first member 316 extends above top surface 206 of shock absorbing frame 205. Flexible shock bumper 314 includes a mount feature 331. Mount feature 331 includes an aperture 330. Aperture 330 is positioned through first member 316 and centered about an axis 334. Aperture 330 is configured to receive a mount fastener, such as a screw, for mounting the shock absorbing device 203 to a host device. The shape of flexible shock bumper 314 can be other shapes besides a circular shape as shown.

Flexible shock bumper 214, shown in the embodiment illustrated in FIGS. 2 and 3, and flexible shock bumper 314, shown in the embodiment illustrated in FIG. 4, provide four corners 212 of shock absorbing frame 205 with the ability to deflect shock prior to impact on rails 202. The flexible shock bumpers have the ability to absorb a large amount of shock energy. The apertures 230, 232 and 330 and slot 240 provide flexible shock bumpers 214 and 314 with a much more flexible corner than a corner having a solid material.

Apertures 230, 232 and 330 provide the HDA, surrounded by shock absorbing device 203, to be soft mounted or flexibly mounted to a host device using mount fasteners. To soft mount the disc drive to the host device, mount fasteners are passed through at least one of the apertures of the shock absorbing device 203 (i.e. apertures 230, 232 and 330) and through the mounting mechanism of the host device. The fasteners used to mount the HDA to a host device do not pass through a cover, base or any other part of the housing of the disc drive. Such a method of mounting to a host device takes up a very insignificant amount of space as well as reduces the transmission of shock and vibration energy to the disc drive, which prevents disc drive damage. Shock absorbing device 203 can include any type of single molding material that is suitable for shock and vibration absorption and isolation.

Figure 5:
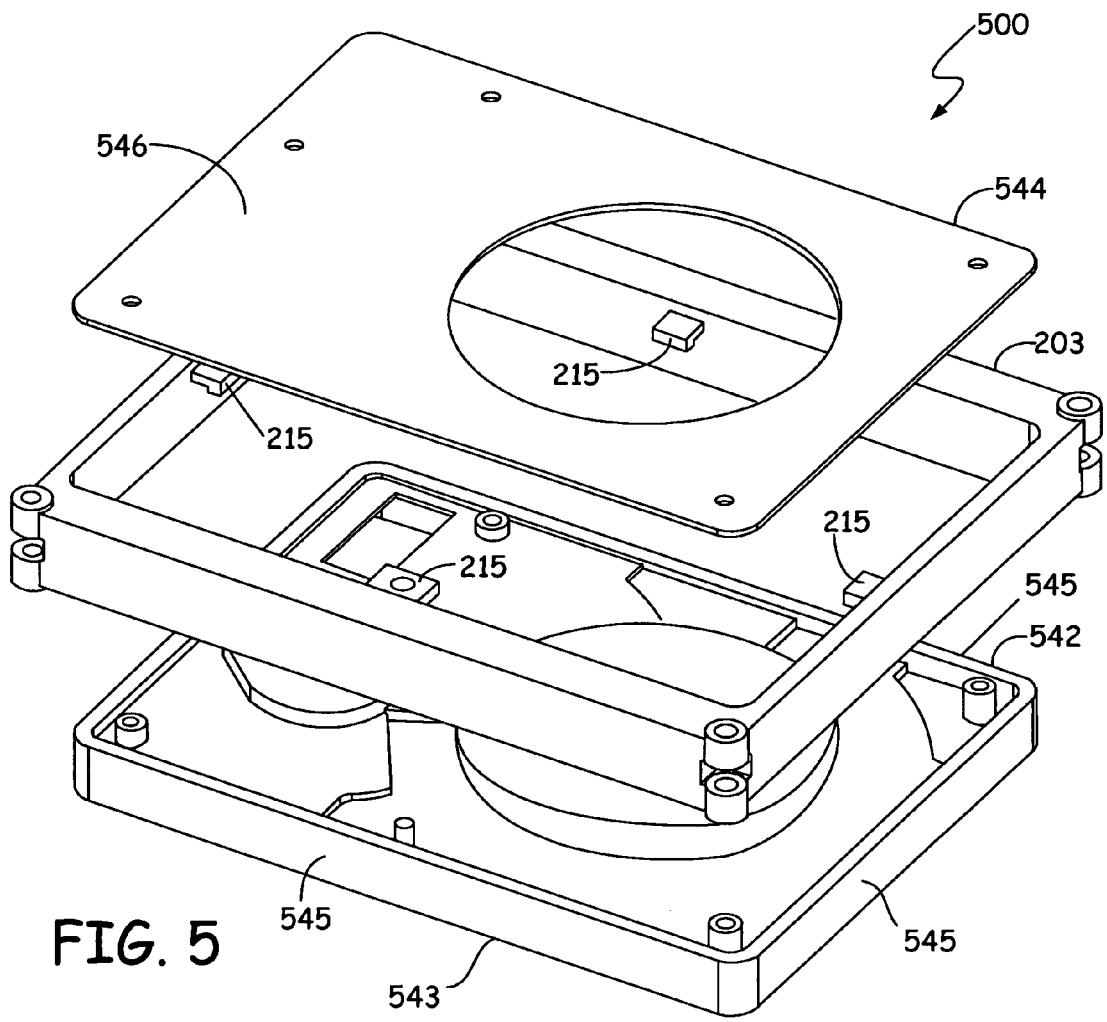
FIG. 5 illustrates a bottom exploded perspective view of an embodiment of a disc drive.

FIG. 5 illustrates a bottom exploded perspective view of a disc drive 500 in accordance with an embodiment of the present invention. Disc drive 500 includes shock absorbing device 203 (also illustrated in FIG. 2), hermetically sealed enclosure or head disc assembly (HDA) 542 and printed circuit board assembly (PCBA) 544. HDA 542 includes a base 543, a top cover (hidden from view in FIG. 5) and sidewalls 545. Although not illustrated in FIG. 5, disc drive 500 includes an electrical connector that can be connected to a bottom surface 546 of PCBA 544. The electrical connector of FIG. 5 is coupleable to a host device for receiving information from the host device and transmitting information to the host device.

To assemble disc drive 500, shock absorbing frame 205 is coupled and positioned adjacent to sidewalls 545 and at least partially surrounds HDA 542 before PCBA 544 is mounted to HDA 542 with a plurality of screws (only the screw holes are shown in FIG. 5 for simplicity). Once PCBA 544 is mounted to HDA 542, lock features 215 of shock absorbing device 203 are clipped and locked onto HDA 542 to engage the HDA. Locking features 215 can be made of the same material as rails 204 of shock absorbing device 203. Lock features 215 prevent shock absorbing device 203 from moving away from HDA 542 after PCBA 544 is mounted to the HDA. In addition, lock features 215 can also press PCBA 544 and HDA 542 together such that they can be tightly mounted together.

Figure 6:
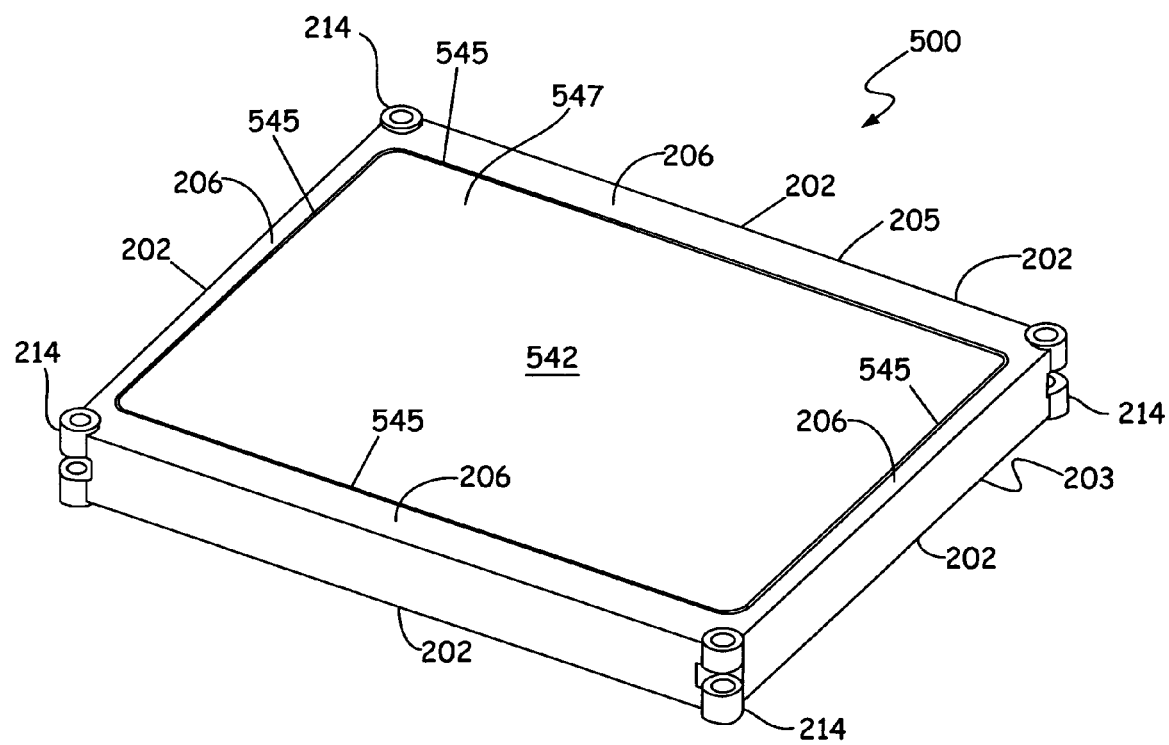
FIG. 6 illustrates a top assembled perspective view of the disc drive of FIG. 5.

FIG. 6 illustrates a top perspective view of an assembled disc drive 500 including shock absorbing frame 205 having top surface 206 and the hermetically sealed enclosure or HDA 542. Enclosure 542 includes top cover 547, sidewalls 545 and a base (not illustrated in FIG. 6). Flexible shock bumpers 214 formed integrally with shock absorbing frame 205 are spaced apart from sidewalls 545 of enclosure 542.

Figure 7:
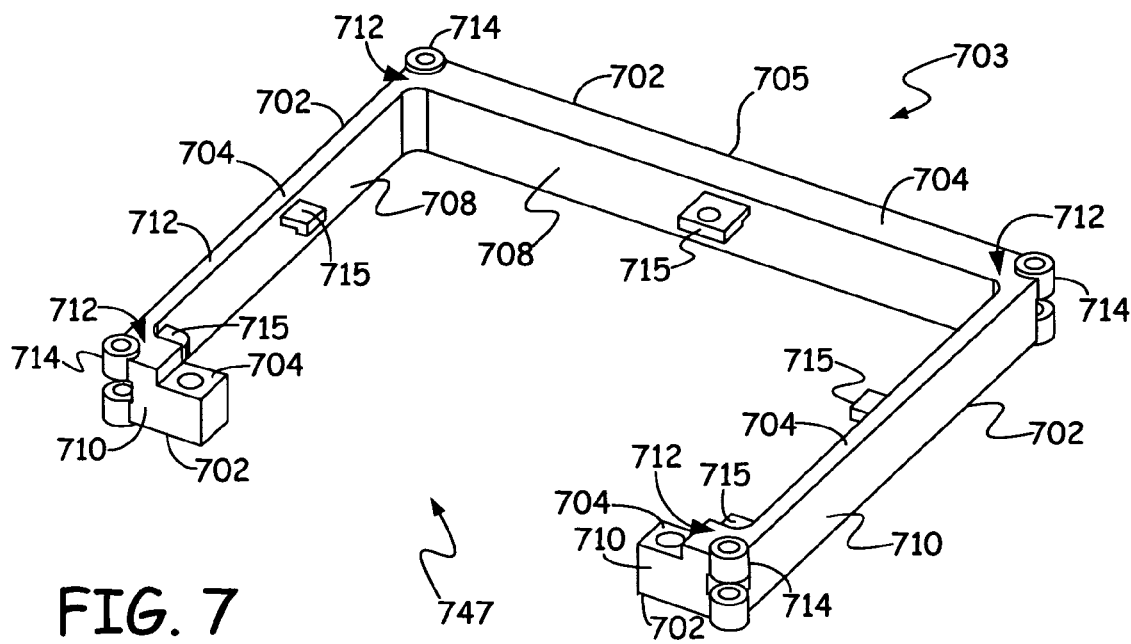
FIG. 7 illustrates a bottom perspective view of an embodiment of a shock absorbing device.
Figure 8:
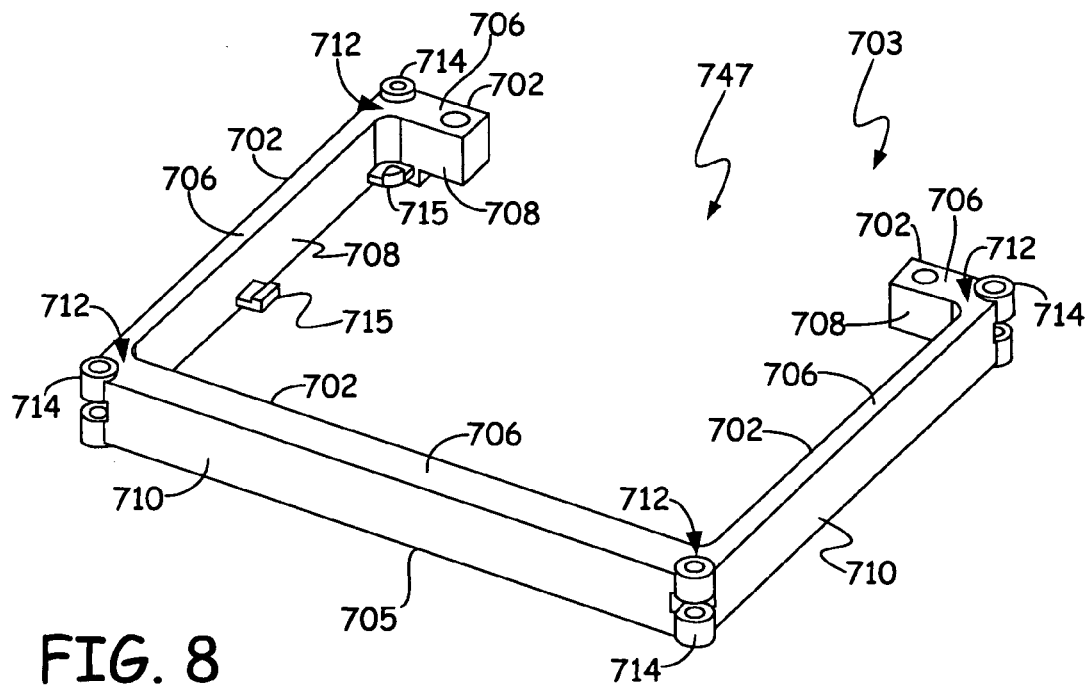
FIG. 8 illustrates a top perspective view of the shock absorbing device of FIG. 7.

FIGS. 7 and 8 illustrates perspective views of a shock absorbing device 703 in accordance with an embodiment of the present invention. FIG. 7 illustrates a bottom perspective view while FIG. 8 illustrates a top perspective view. Shock absorbing device 703, although not illustrated in FIG. 7 or 8, is configured to at least partially surround a small sized head disc assembly. Shock absorbing device 703 includes a shock absorbing frame 705. Shock absorbing frame 705 includes a bottom surface 704, a top surface 706, an inner surface 708 and an outer surface 710. Shock absorbing frame 705 also includes a plurality of mutually coupled rails 702. The plurality of rails 702 are mutually coupled to form four corners 712.

Shock absorbing device 703 includes a plurality of flexible shock bumpers 714 integrally formed with shock absorbing frame 705 and positioned at each of the four corners 712 of rails 202. Flexible shock bumpers 714 extend below bottom surface 704 of shock absorbing frame 205, extend above top surface 706 of shock absorbing frame 205 and extend outwardly from outer surface 710 of shock absorbing frame 205. Flexible shock bumpers 714 assist in absorbing shock energy inflicted on the head disc assembly (not shown in FIG. 7 or 8) when the head disc assembly is placed under stress. For example, flexible shock features 714 can absorb shock energy when the head disc assembly is dropped or placed under vibration. Even though shock absorbing device 703 is illustrated with flexible shock bumpers that were discussed and illustrated in the embodiment of FIGS. 2 and 3, shock absorbing device 703 can also include flexible shock bumpers as discussed and illustrated in the embodiment of FIG. 4.

Figure 9:
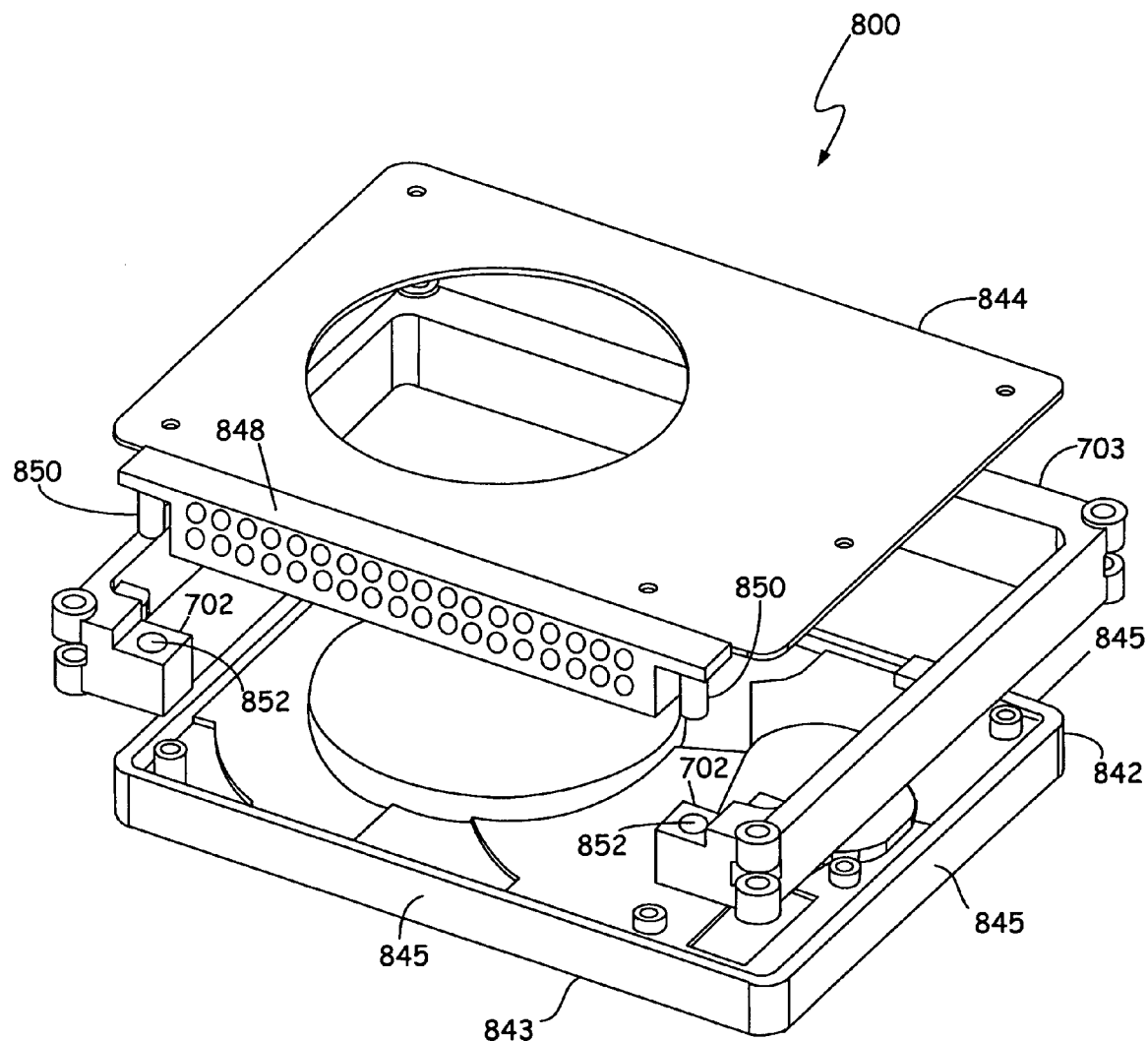
FIG. 9 illustrates a bottom exploded perspective view of an embodiment of a disc drive.

In FIGS. 7 and 8, one of the rails 702 includes an opening 747. Opening 747 is configured for accommodating an electrical connector body (as shown in FIG. 9). Shock absorbing device 703 also includes a plurality of lock features 715. Each lock feature 715 is positioned on inner surface 708 of shock absorbing frame 205. The lock features 715 receive and secure a hermetically sealed enclosure or head disc assembly (HDA) of a disc drive. Lock features 715 can also be used to press a printed circuit board assembly (PCBA) against a HDA such that a PCBA can be tightly mounted to a HDA. Although FIGS. 7 and 8 illustrates each inner surface 708 of each rail 702 having a lock feature, shock absorbing device 703 can include any number of lock features. Shock absorbing device 703 also includes additional lock features 715, compared to those illustrated in FIGS. 2 and 3. These additional lock features 715 are located at the two corners adjacent the rail 702 having opening 747.

FIG. 9 illustrates an exploded perspective view of a disc drive 800 in accordance with an embodiment of the present invention. Disc drive 800 includes shock absorbing device 703 (also illustrated in FIGS. 6 and 7) having a shock absorbing frame 705, hermetically sealed enclosure or head disc assembly (HDA) 842 and printed circuit board assembly (PCBA) 844. HDA 842 includes a base 843, a top cover (hidden from view in FIG. 8) and sidewalls 845. As illustrated in FIG. 9, disc drive 800 includes an electrical connector body 848 connected to a side of PCBA 844. The electrical connector of FIG. 9 is coupleable to a host device for receiving information from the host device and transmitting information to the host device. In one embodiment, electrical connector 848 connected to PCBA 844 is coupled to shock absorbing frame 705 by coupling a pair of poles 850 included in electrical connector 848 with a pair of receiving apertures 852 included in rail 702 having opening 747. Receiving apertures 852 are configured to receive poles 850 upon coupling electrical connector 848 to the rail 702 having opening 747. Interlocking poles 850 and apertures 852 prevents the shock absorbing frame 205 from tilting near the electrical connector body 848. It should be noted that alternative ways of coupling electrical connector 848 to shock absorbing frame 205 are possible.

To assemble disc drive 800, shock absorbing frame 205 is coupled and positioned adjacent to sidewalls 845 and at least partially surrounds HDA 842 before PCBA 844 is mounted to HDA 842 with a plurality of screws (only the screw holes are shown in FIG. 9 for simplicity). Once PCBA 844 is mounted to HDA 842, lock features 715 of shock absorbing device 703 are clipped and locked onto HDA 842 to engage the HDA. Lock features 715 prevent shock absorbing frame 205 from moving away from HDA 842 after PCBA 844 is mounted to the HDA. In addition, lock features 715 can also press PCBA 544 and HDA 542 together such that they can be tightly mounted together.

Figure 10:
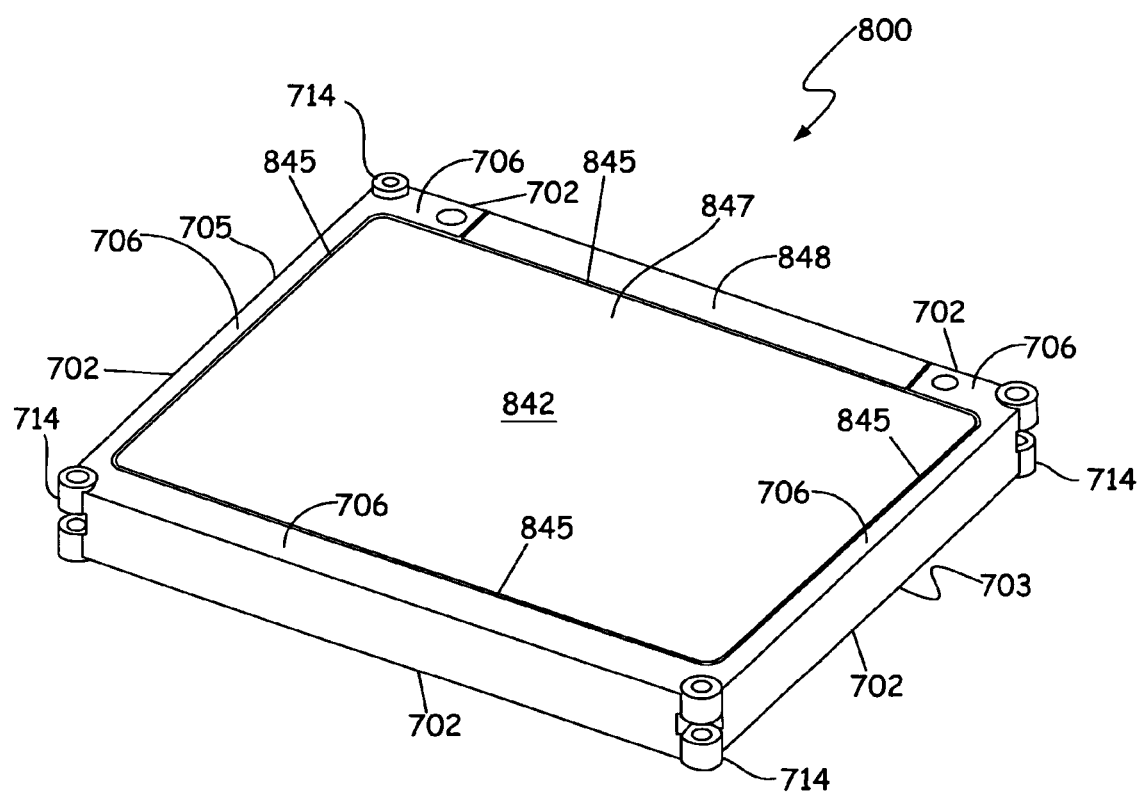
FIG. 10 illustrates a top assembled perspective view of the disc drive of FIG. 9.

FIG. 10 illustrates a top perspective view of an assembled disc drive 800 including a shock absorbing device 703 and hermetically sealed enclosure or HDA 842. Shock absorbing device 703 includes the plurality of mutually coupled rails 702 of shock absorbing frame 705 having top surfaces 706. Enclosure 842 includes top cover 847, sidewalls 845 and a base (not illustrated in FIG. 10). Flexible shock bumpers 714 of shock absorbing device 703 are spaced apart from sidewalls 845 of enclosure 842. Disc drive 800 includes electrical connector body 848 connected to a side of PCBA 844 and coupled to one of the rails 702. The electrical connector of FIG. 9 is coupleable to a host device for receiving information from the host device and transmitting information to the host device.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the hermetically sealed enclosure while maintaining substantially the same functionality without departing from the scope and spirit of the present invention. In addition, although the preferred embodiment described herein is directed to a shock absorbing device for data storage system, it will be appreciated by those skilled in the art that the teachings of the present invention can be applied to other types of shock absorbing devices, without departing from the scope and spirit of the present invention.

What is the claimed is:

1. A shock absorbing device for an enclosure, the device comprising:
    a shock absorbing frame including an inner surface and an outer surface, the inner surface configured for coupling adjacent to the enclosure and the outer surface including a top surface and a bottom surface; and
    a plurality of flexible shock bumpers spaced apart from each other and included on the outer surface of the shock absorbing frame, each flexible shock bumper comprising:
        a first surface that extends above the top surface of the shock absorbing frame;
        a second surface that extends below the bottom surface of the shock absorbing frame; and
        an aperture extending between the first surface and the second surface and configured to receive a mount fastener for securing the shock absorbing frame that is coupled to the enclosure to a host device.

2. The shock absorbing device of claim 1, wherein the enclosure comprises a head disc assembly.

3. The shock absorbing device of claim 1, wherein each flexible shock bumper includes at least two spaced apart members.

4. The shock absorbing device of claim 3, wherein the aperture included in each flexible shock bumper extends through the spaced apart members.

5. The shock absorbing device of claim 1, in which each flexible shock bumper comprises at least one recessed slot.

6. The shock absorbing device of claim 1, in which the shock absorbing device is formed from a single material.

7. The shock absorbing device of claim 1, wherein each flexible shock bumper is integrally formed with the shock absorbing frame.

8. The shock absorbing device of claim 1, wherein the shock absorbing frame comprises a plurality of mutually coupled rails that form four corners, each flexible shock bumper is joined and positioned at each of the four corners of the shock absorbing frame.

9. The shock absorbing device of claim 8, wherein one of the plurality of rails is configured for coupling with an electrical connector body.

10. The shock absorbing device of claim 1, wherein the shock absorbing frame comprises at least one lock feature positioned on the inner surface for engaging the enclosure.

11. A data storage system comprising:
    a head disc assembly;
    a printed circuit board assembly coupled to the head disc assembly;
    a shock absorbing frame having an inner surface and an outer surface, the shock absorbing frame coupled and positioned adjacent to sidewalls of the head disc assembly and comprising:
        a plurality of mutually coupled rails having top surfaces and bottom surfaces; and
        a plurality of flexible shock bumpers integrally formed with the rails and included on the outer surface of the shock absorbing frame, each flexible shock bumper extending above the top surfaces of the mutually coupled rails and extending below the bottom surfaces of the mutually coupled rails.

12. The data storage system of claim 11, wherein each flexible shock bumper comprises:
    a first surface that extends above the top surfaces of the mutually coupled rails;
    a second surface that extends below the bottom surfaces of the mutually coupled rails; and
    an aperture extending between the first surface and the second surface and configured to receive a mount fastener for securing the shock absorbing frame coupled to the head disc assembly to a host device.

13. The data storage system of claim 11, wherein the plurality of mutually coupled rails form four corners, each flexible shock bumper is integrally formed with one of the four corners.

14. The data storage system of claim 11, wherein the shock absorbing frame and the plurality of flexible shock bumpers comprise a single molded material suitable for shock absorption and isolation.

15. A shock absorbing device for an enclosure, the device comprising:
    a shock absorbing frame including an inner surface and an outer surface, the inner surface configured for coupling adjacent to the enclosure;
    a plurality of flexible shock bumpers spaced apart from each other and included on the outer surface of the shock absorbing frame, each flexible shock bumper including a mount feature; and
    wherein the shock absorbing device is formed from a single material.

16. The shock absorbing device of claim 15, wherein the shock absorbing frame comprises a plurality of mutually coupled rails, wherein one of the plurality of mutually coupled rails includes an opening configured to accommodate an electrical connector body.

* * * * *